United States Patent [19]

Pechhold

[11] Patent Number: 5,107,033
[45] Date of Patent: Apr. 21, 1992

[54] PERFLUOROALKYL POLYETHER GLYCOLS AND THEIR USE

[75] Inventor: Engelbert Pechhold, Chadds Ford, Pa.

[73] Assignee: E. I. Du Pont de Nemours and Company, Wilmington, Del.

[21] Appl. No.: 547,420

[22] Filed: Jul. 2, 1990

Related U.S. Application Data

[63] Continuation-in-part of Ser. No. 349,980, May 8, 1989, abandoned, which is a continuation-in-part of Ser. No. 163,037, Mar. 2, 1988, abandoned.

[51] Int. Cl.$^5$ ............................................. C07C 43/12
[52] U.S. Cl. ..................................... 568/615; 568/677
[58] Field of Search .............................. 568/615, 677

[56] References Cited

U.S. PATENT DOCUMENTS 4,427,803  1/1984  Fukui et al. .................. 523/402

FOREIGN PATENT DOCUMENTS

| 57443 | 8/1982 | European Pat. Off. . |
| 152065 | 8/1985 | European Pat. Off. ............ 568/615 |
| 46-25361 | 7/1971 | Japan . |
| 25361 | 7/1971 | Japan . |
| 47948 | 3/1986 | Japan . |
| 133244 | 6/1986 | Japan . |
| 152745 | 7/1986 | Japan . |
| 782615 | 9/1957 | United Kingdom . |

*Primary Examiner*—Howard T. Mars

[57] ABSTRACT

Homo- and copolymers of 3-perfluoroalkyl-1,2-epoxypropane having a number average molecular weight between about 650 and 5000, preferably 1000 to 3000, are prepared by polymerizing 3-perfluoroalkyl-1,2-epoxypropane in the presence of an acidic catalyst and preferably a molecular weight controlling agent.

9 Claims, No Drawings

PERFLUOROALKYL POLYETHER GLYCOLS AND THEIR USE

This application is a continuation-in-part of application Ser. No. 07/349,980 filed May 8, 1989 which is a continuation-in-part of Ser. No. 07/163,037 filed Mar. 2, 1988 both now abandoned.

FIELD OF THE INVENTION

The present invention relates to polyether glycols containing pendant perfluoroalkyl groups, and to segmented block copolymers derived therefrom.

BACKGROUND OF THE INVENTION

Polyether, polyester or polycarbonate glycols at molecular weights of 650 to 5000 are usually used as soft segments in various segmented block copolymers such as polyurethanes and elastomeric polyesters. On the other hand, compounds which contain perfluoroalkyl groups of sufficient length are known to dramatically reduce surface energy in systems, giving rise to water and oil repellency as well as antisoiling properties.

Fluorine-containing polyethers of the formula:

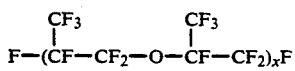

are disclosed in U.S. Pat. No. 3,242,218, and polyether glycols of the formula:

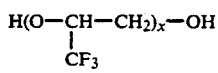

are disclosed in U.K. Patent Specification No. 782.615. The former materials are nonfunctional compounds; consequently, they could not be used to form segmented block copolymers. On the other hand, the latter, due to the single perfluoromethyl group, provides such very marginal surface energy reduction that it is incapable of providing any effective oil or water repellency. U.S. Pat. Nos. 3,896,251, 4,046,944 and 4,540,765 disclose the preparation of polyurethanes, using glycols of the gene al formula:

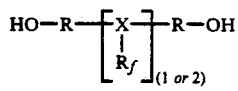

However, it is well known that monomeric glycols such as those disclosed in the latter three U.S. patents yield segmented polymers having inferior physical properties, such as tensile strength and modulus; e.g. they fail to give polyurethanes having sufficient elasticity. Monomeric glycols or diamines are usually used as curing agents or chain extenders and become part of the hard segment. On the other hand, the amorphous soft segment in form of an oligomeric ester, ether or carbonate glycol has to be long enough to equalize the hard crystalline urea or urethane segment.

U.S. Pat. No. 4,427,803 discloses using polyethers derived from 3-perfluoroalkyl-1,2-epoxy-propane in combination with other materials as mold release agents. The patentees state that their polymers are known from British Patent No. 782615 which discloses cationic polymerization of 3,3,3-trifluoro-1,2-epoxypropane or its 2-methyl analog to a high molecular weight polymer; e.g. the former is polymerized to a molecular weight in excess of 50,000. Using the British process with the monomers disclosed in the U.S. patent leads to nonfunctional cyclic ethers and/or high molecular ethers with a functionality of less than two. Because such products have little or no functionality, they apparently are well suited as mold release agents. By the same token, however, they are quite unsuitable for making useful polymers. European Patent Application 0 152 065 prepares copolymers of Ω-perfluoroalkyl-1,2-epoxyalkanes (including propane) with various other epoxy compounds. No chain transfer agent is recited in the Examples of the European Application, and as a consequence, the copolymers are of high molecular weight, making them unsuitable for incorporation into segmented block copolymers, such as polyurethanes and elastomeric polyesters (the average molecular weights are between 7050 in Example 3 and 13,600 in Example 12). In a similar fashion, water-and oil-repellent agents are described in Japanese Patent Application 46-25361, published July 22, 1971. Those agents comprise homopolymers and copolymers prepared by polymerizing 3-perfluoroalkyl-1,2-epoxy-propanes in the absence of any molecular weight control agent. As a consequence, those polymers also would be unsuitable for preparing the above-mentioned segmented block copolymers, as their molecular weights would be entirely too high.

BRIEF SUMMARY OF THE INVENTION

Novel polymers of 3-perfluoroalkyl-1,2-epoxy-propane having a number average molecular weight in the range between about 650 and about 5000 are provided. They can be prepared by polymerizing 3-perfluoroalkyl-1,2-epoxypropane in the presence of an acidic catalyst and a molecular weight controlling agent.

DETAILED DESCRIPTION OF THE INVENTION

The novel polymers of the present invention comprise oligomeric glycols having a molecular weight in the range between about 650 and about 5000, preferably between about 1000 and about 3000, most preferably about 1500 to about 2000, which can be represented by the general formula:

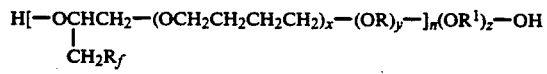

wherein
R is a divalent radical of the formula:

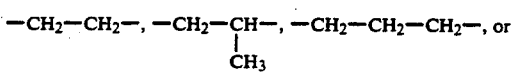

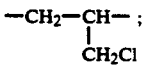

$R^1$ is a divalent aliphatic hydrocarbon radical containing 2 to 12 carbon atoms;
$R_f$ is a straight or branched chain perfluoroalkyl radical containing 4 to 12 carbon atoms or mixtures thereof;
x is 0 to 10;

y is 0 to 10;

n is 2 to 10, and z is 0 or 1.

Tetrahydrofuran can serve both as a solvent and as a comonomer for the purposes of this invention; in that case, x is 1 to 20.

The fluorinated monomers most preferred for the purposes of the present invention are those wherein $R_f$ is a mixture of perfluoroalkyl groups, $CF_3CF_2(CF_2)_m$ in which m is 2, 4, 6, 8 and 10 in the approximate weight ratio of 0.3/61.4/31.8/6/0.3.

The oligomeric polymers of this invention comprise copolymers as well as homopolymers. The oligomeric copolymers and homopolymers of this invention can be prepared in the presence of an acidic catalyst. Copolymers can be prepared in accordance with this invention from 3-perfluoroalkyl-1,2-epoxypropane and one or more comonomers, such as ethylene oxide, 1,2-propylene oxide, epichlorohydrin, oxetane, tetrahydrofuran, and the like. The acid catalyst can be a fluosulfonic acid; a Lewis acid such as antimony pentafluoride, boron trifluoride, tin tetrachloride, aluminum trichloride, etc.; solid acidic materials such as acidic montmorillonite clay or a strongly acidic cationic resin commercially available from E. I. du Pont de Nemours and Company as NAFION ® perfluorosulfonic acid resin.

Except when fluosulfonic acid is used as a catalyst, a chain stopper (a molecular weight control agent) should be used. Otherwise, the product will be too high in molecular weight to serve as soft segments in segmented block copolymers, such as polyurethanes and elastomeric polyesters. When fluosulfonic acid is used as the catalyst, the molecular weight of the product can be controlled by controlling the amount of catalyst used. The molecular weight of the polyether glycol oligomers of this invention will largely depend upon the amount of molecular weight control agent used. Generally water or any glycol containing from 2 to about 12 carbon atoms, and more desirably from 2 to 6 carbon atoms, may be utilized. Example of specific glycols include ethylene and the various propylene, butylene and hexylene glycols. By the term "various" the various isomers of the glycol are meant. Preferred compounds include ethylene glycol, 1.4-butanediol and 1,6-hexanediol. Generally a range from about 0.05 to 0.5 mole of diol or water per mole of monomer is used. If solid acidic catalysts are used (acidic montmorillonite, NAFION ® H+ resin or the like) the preferred molecular weight controlling agent is acetic anhydride. The desired polyether glycol is then liberated by saponification of the corresponding diacetate. When a glycol is used as the molecular weight controlling agent, "z" in the foregoing formula is 1 and "-OR$^1$-" is a radical derived from the glycol. When water or an anhydride is used for that purpose and the resulting diacetate hydrolyzed, "z" is 0.

Before the polyether glycol is converted into a polyurethane or polyester, catalyst residues, excess diol, water and monomers are removed. The fluorine-containing polyether glycol of this invention can be used as soft segment by itself or in combination with other commercially available polyether glycols, polyester glycols or polycarbonate glycols. The preparation of polyurethanes or polyesters can be carried out in bulk or in a suitable solvent. Aqueous polyurethanes can be made if appropriate ionic modifiers are used. For the preparation of a polyurethane, any aliphatic or aromatic di- or poly-isocyanate can be used, usually in excess so that the polyurethane chains or networks that are formed carry at their ends free isocyanate groups which can either be extended to their optimum length with short chain aliphatic or aromatic glycols as well as diamines, or be blocked with a suitable protective group. For the preparation of linear polyesters any aliphatic or aromatic diacid or anhydride can be used together with short chain aliphatic or aromatic glycols.

The following examples are illustrative of the invention. The 3-perfluoroalkyl-1,2-proplyene oxides used in the examples are the most preferred such compounds described hereinabove. Unless specified otherwise, the composition of the products described in the examples was determined by proton NMR.

EXAMPLE 1

Into a reactor was charged 1 mol of 3-perfluoroalkyl-1,2-propylene oxide with an epoxide equivalent of 487 and 0.27 mole of ethylene glycol. To the mixed components was added at 5° C. under nitrogen 5.4 ml of a boron trifluoride/tetrahydrofuran complex at a rate of 0.15 ml per minute. The resulting exotherm (to 126° C.) was controlled by cooling with an ice-bath to a temperature of about 50° C. The reactants became homogeneous and viscous, and the agitated reaction mass was then held for 2 hours at 75° C. before the addition of 60 ml of deionized water. After holding with agitation for 1 hour at 75° C., 8.8 g of calcium oxide powder was added and heating was continued with agitation for another hour at 75° C. The reaction product was then filtered and dried for about 2 hours at 80°–85° C. under a pressure of 1300–2000 Pa (10–15 mm Hg), giving rise to a straw-colored viscous oil, which partially crystallized on standing. The polyether glycol thus obtained had the following characteristics:

(1) Number average molecular weight: 1533
(2) Viscosity: 2.9 Pa.s at 40° C.
(3) Fluorine Content: 67.0 Wt %
(4) Composition:

| By Weight | 97.7% of 3-perfluoroalkyl-1,2-propylene oxide |
| | 2.3% of ethylene glycol |
| Mole Ratio | 3-perfluoroalkyl-1,2-propylene oxide/ ethylene glycol = 1:0.265 |

EXAMPLE 2

Into a reactor was charged with agitation 1 mol of 3-perfluoroalkyl-1,2-propylene oxide with an epoxide equivalent of 440, 2.65 moles of tetrahydrofuran and 0.269 mole of ethylene glycol. The agitated monomer mixture was cooled under nitrogen to 4° C. before the addition of 5.1 ml of boron trifluoride/-tetrahydrofuran complex at a rate of 0.15 ml per minute. The resulting exotherm to 43° C. was controlled through intermittent cooling with an ice-bath to a temperature of about 20° C. After completion of catalyst addition, heating with agitation was continued for another hour at 70° C. To the agitated homogeneous reaction mass was added 180 ml of deionized water. After holding with agitation for 1 hour at 70° C., 9 g calcium oxide powder was added and heating was continued for another hour at 70° C. The reaction product was then filtered and dried for about 2 hours at 80°–85° C. under a pressure of 1300–2000 Pa (10–15 mm Hg), giving rise to a straw-colored viscous oil.

The copolyether glycol thus obtained, had the following characteristics:
(1) Number average molecular weight: 1696
(2) Viscosity: 2.5 Pa.s at 40° C.
(3) Fluorine Content: 48.6 Wt %
(4) Composition:

| By Weight | 75.2% of 3-perfluoroalkyl-1,2-propylene oxide |
| --- | --- |
|  | 22.8% of tetrahydrofuran |
|  | 2.0% of ethylene glycol |
| Mole Ratio | Tetrahydrofuran/3-perfluoroalkyl-1,2-propylene oxide/ethylene glycol = 1:0.54:0.14 |

EXAMPLE 3

In an appropriate container, a homogeneous monomer feed was made up consisting of 1 mol 3-perfluoroalkyl-1,2-propylene oxide (epoxide equivalent 440), 2.65 mols of tetrahydrofuran and 0.269 mol of ethylene glycol. With agitation, 75 ml of the homogeneous monomer feed was charged into a reactor. The agitated monomer feed was cooled to 3° C. under nitrogen before the addition of 5.1 ml of boron trifluoride/tetrahydrofuran complex at a rate of 0.15 ml per minute. During addition, the temperature rose slowly to 37° C. After completion of catalyst addition, the remaining monomer feed was added with agitation at such a rate as to maintain the reaction temperature between 36° and 42° C. The agitated reaction mass was then held at 50° C. for 3 hours before the addition of 120 ml of deionized water. After holding with agitation for 1 hour at 50° C., 9 g of calcium oxide powder were added and heating agitation were continued for another hour at 50° C. The reaction product was then filtered and dried for about 2 hours at 80°–85° C. under a pressure of 1300–2000 Pa (10–15 mm Hg), yielding a straw-colored viscous oil. The copolyether glycol thus obtained had the following characteristics:
(1) Number average molecular weight: 1710
(2) Viscosity: 2.6 Pa.s at 40° C.
(3) Fluorine Content: 51.1 Wt %
(4) Composition:

| By Weight | 76.5% 3-perfluoroalkyl-1,2-propylene oxide |
| --- | --- |
|  | 21.6% tetrahydrofuran |
|  | 1.9% ethylene glycol |
| Mole Ratio | Tetrahydrofuran/3-perfluoroalkyl-1,2-propylene oxide/ethylene glycol = 1:0.58:0.14 |

EXAMPLE 4

Into a reactor was charged with agitation 1 mol of 3-perfluoroalkyl1,2-propylene oxide with an epoxide equivalent of 440, 15 mols of tetrahydrofuran and 0.358 mol of ethylene glycol. The resulting homogeneous monomer mixture was cooled with agitation under nitrogen to 4° C. A boron trifluoride/tetrahydrofuran complex (24 ml) was fed with agitation to the cooled mixture at a rate of 0.3 ml per minute; during which, the temperature to rise to a maximum of 48° C. After completion of catalyst addition, heating and agitation were continued at 70° C. for 2 hours. To the agitated homogeneous reaction mass was added 280 ml of deionized water. After holding with agitation for 1 hour at 70° C., 39.1 g calcium oxide powder was added, and heating and agitation were continued for another hour at 70° C.

The reaction product was then filtered and dried for about 2 hours at 80°–85° C. under a pressure of 1300–2000 Pa (10–15 mm Hg) giving rise to a straw-colored viscous oil. The copolyether glycol thus obtained had the following characteristics:
(1) Number average molecular weight: 1779
(2) Viscosity: 6.9 Pa.s at 40° C.
(3) Fluorine Content: 29.6 Wt %
(4) Composition:

| By Weight | 46.5% of 3-perfluoroalkyl-1,2-propylene oxide |
| --- | --- |
|  | 52.4% of tetrahydrofuran |
|  | 1.1% of ethylene glycol |
| Mole Ratio | Tetrahydrofuran/3-perfluoroalkyl-1,2-propylene oxide/ethylene glycol = 1:0.14:0.03 |

EXAMPLE 5

Into a reactor was charged with agitation 1 mol of 3-perfluoroalkyl-1,2-propylene oxide (epoxide equivalent 440), 3 mols of tetrahydrofuran, 1 mol of ethylene oxide and 0.28 mol of ethylene glycol. The agitated homogeneous monomers mixture was cooled under nitrogen to 3° C. before the addition of 15.7 ml of boron trifluoride-tetrahydrofuran complex at a rate of 0.15 ml per minute. The reaction mixture was continuously cooled with agitation so as to control the exotherm below 20° C. After completion of catalyst addition, the reaction mass was agitated for 2 hours at 70° C. Then 250 ml of deionized water was added to the agitated reaction mass. After holding with agitation for 1 hour at 70° C., 31.3 g of calcium oxide powder were added, and heating and agitation were continued for another hour at 70° C. The reaction product was then filtered and dried for about 2 hours at 80°–85° C. under a pressure of 1300–2000 Pa (10–15 mm Hg), yielding a straw-colored viscous oil. The terpolyether glycol thus obtained had the following characteristics:
(1) Number average molecular weight: 1612
(2) Viscosity: 2.6 Pa.s at 40° C.
(3) Fluorine Content: 46.9 Wt %
(4) Composition:

| By Weight | 71.7% of 3-perfluoroalkyl-1,2-propylene oxide |
| --- | --- |
|  | 21.9% tetrahydrofuran |
|  | 6.4% ethylene oxide + ethylene glycol |

EXAMPLE 6

Into a reactor was charged with agitation 1 mol of 3-perfluoroalkyl-1,2-propylene oxide with an epoxide equivalent of 437, 1 mol of epichlorohydrin and 0.4 mol of ethylene glycol. The agitated monomer mixture was cooled to 3° C. under nitrogen before the addition of 11.4 ml of boron trifluoride/tetrahydrofuran complex at a rate of 0.15 ml per minute. To control the exotherm, intermittent cooling was supplied. After completion of catalyst addition, the reaction mass was agitated for 12 hours at 80° C. To the agitated reaction mass was then added 220 ml of deionized water. After agitating for another hour at 80° C., the product was dried for about 2 hours at 80°–85° C. under a pressure of 1300–2000 Pa (10–15 mm Hg) giving a yellowish, hazy oil.

The copolyether glycol thus obtained had the following characteristics:
(1) Number average molecular weight: 1352
(2) Fluorine Content: 52.5 Wt %

EXAMPLE 7

Into a reactor was charged with agitation 1 mol of 3-perfluoroalkyl-1,2-propylene oxide with an epoxide equivalent of 440, and 2.65 mols of tetrahydrofuran. The agitated monomer mixture was cooled to 3° C. under nitrogen before the addition of 5.4 ml of fluosulfonic acid at a rate of 0.4 ml per minute, causing an exotherm to 15° C. After completion of the catalyst addition, the temperature of the reaction mass was slowly raised to 20°, 30° and finally 40° C. while continuing agitation. After holding the reaction mass with agitation for 5 hours at 40° C., a total of 120 ml of deionized water was added and agitation was continued for 1 hour at 40° C. To the reaction mass was then added 9 g of calcium oxide powder, and heating and agitation were continued for another hour at 40° C. The reaction product was then filtered and dried for about 2 hours at 80°-85° C. under a pressure of 1300-2000 Pa (10-15 mm Hg) giving a yellowish oil which partially crystallized on standing at room temperature.

The copolyether glycol thus obtained had the following characteristics:
(1) Number average molecular weight: 1278
(2) Viscosity: 2.4 Pa.s at 60° C.
(3) Fluorine Content: 52.5 Wt %
(4) Composition:

| By Weight | 88.5% of 3-perfluoroalkyl-1,2-propylene oxide |
| --- | --- |
|  | 11.5% tetrahydrofuran |
| Mole Ratio | Tetrahydrofuran/3-perfluoroalkyl-1,2-propylene oxide = 1:1.26 |

CONTROL

A polyether glycol containing no fluorine was converted to a polyurethane in the following manner. Into a reaction vessel was charged 0.05 mol of a poly(tetramethylene ether glycol) [PTMEG] with a number average molecular weight of 1888, 0.15 mol of diphenylmethane-4,4'-diisocyanate, 0.1 mol of 4-butanediol and 200 ml of dry dimethylformamide. To the agitated mixture under nitrogen atmosphere was added 1 drop of dibutyltin dilaurate catalyst. An exotherm was noticed immediately together with a rise in viscosity. After the exotherm subsided, the very viscous solution was heated for another hour at 85° C. before being further diluted with dimethylformamide and/or tetrahydrofuran. The solution was cast onto a glass plate and allowed to dry for 4 hours at room temperature and 4 hours at 85° C. to an elastic coating. The surface properties of the coating was determined by contact angle measurements using deionized water and hexadecane. The results are shown in Table I.

EXAMPLE 8

A blend of a non-fluorinated polyether glycol with a fluorine-containing polyether glycol was converted to a polyurethane in the following manner. Into a reaction vessel was charged 0.025 mol of a poly(tetramethylene ether glycol) [Mn(OH)=1888], 0.025 mol of the polyether glycol of Example 3 [Mn(OH)=1719], 0.15 mol of diphenylmethane-4,4-diisocyanate, 0.1 mol of 1,4-butanediol and 200 ml of dry dimethylformamide. The procedure described in the Control was used to make a coating, the surface properties of which are shown in Table 1.

EXAMPLE 9

The fluorine-containing polyether glycols of Examples 2, 3, 4 and 5 were converted to polyurethanes in the following manner. Into a reaction vessel was charged 0.05 mol of polyether glycol of Example 2 (Example 3, 4 and 5 respectively) 0.15 mol of diphenylmethane-4,4,-diisocyanate, 0.1 mol of 1,4-butanediol and 200 mol of dry dimethylformamide. The procedure described in the Control was used to make coatings, the surface properties of which are shown in Table 1.

TABLE 1

| CONTACT ANGLES OF POLYURETHANE COATINGS | | |
| --- | --- | --- |
|  | Polyether | Contact Angles (Advanced), Degrees |
| Coating | Glycol Type | Deionized Water / Hexadecane |

| Coating | Glycol Type | Deionized Water | Hexadecane |
| --- | --- | --- | --- |
| Control | PTMEG | 99 | 17 |
| Example 8 | Blend PTMEG/ Glycol of Example 3 | 122 | 77 |
| Example 9 | Glycol Example 2 | 122 | 79 |
|  | Glycol Example 3 | 114 | 71 |
|  | Glycol Example 4 | 120 | 75 |
|  | Glycol Example 5 | 116 | 74 |

EXAMPLE 10

Into a reaction vessel was charged with agitation 0.1 mol of polyether glycol of Example 3 and 0.2 mol of hexamethylene diisocyanate. The mixture was heated with agitation under nitrogen to 55° C. Then one drop of dibutyltin dilaurate was added with agitation, causing an exotherm up to 90° C. The reaction mass was then held with agitation for 3 hours at 85° C. to give a product having a free isocyanate content of 3.9 as determined by the di-n-butylamine titration technique (Analytical Chemistry of Polyurethanes, Volume XVI, Part III, Wiley Interscience 1969, Pages 357-359). Then 5.9 parts of N-methyldiethanolamine were added to 106.4 parts of the above prepolymer to give an isocyanate/hydroxyl mol ratio of 1 to 1. The resulting polymer was held with agitation for 17 hours at 95° C., and 1.5 g of 2-chloroacetamide were then added with agitation After heating with agitation for 2 hours at 125° C., the polymer was cooled to 90° C., and 2 g of acetic acid in 120 ml of preheated deionized water were added with agitation, followed by 2.8 g of 37% aqueous formaldehyde. The reaction mixture was agitated for an additional ½ hour at 90° C. before being cooled to 50° C. At that point 500 ml of acetone were added. Finally the acetone was stripped from the clear solution at 40°-50° C. under a pressure of 6,700-13,400 Pa (50-100 mm Hg) giving an aqueous cross-linkable polyurethane dispersion. Based on solids, the material contained 43.3 wt % of fluorine.

I claim:
1. Oligomeric glycols having a number average molecular weight in the range between about 650 and about 5000 which can be represented by the general formula:

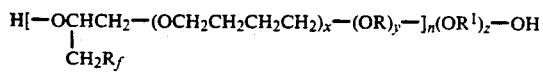

wherein
R is a divalent radical of the formula:

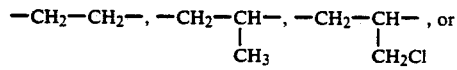

2. The oligomeric glycols of claim 1 having a number average molecular weight between about 1000 and about 3000.

3. The oligomeric glycols of claim 2 wherein $R_f$ is a mixture of perfluoroalkyl groups, $CF_3CF_2(CF_2)_m$ in which m is 2, 4, 6, 8 and 10 in the approximate weight ratio of 0.3/61.4/31.8/6/0.3.

4. The oligomeric glycols of claim 1 wherein x is 0 to 10.

5. The oligomeric glycols of claim 1 wherein x is 1 to 20.

6. The oligomeric glycols of claim 1 wherein n is 2 to 5.

7. Oligomeric glycols having a number average molecular weight in the range between 1500 and about 2000 which can be represented by the general formula:

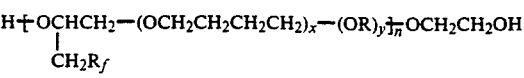

wherein

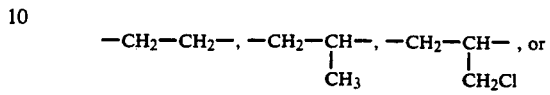

$R_f$ is a straight or branched chain perfluoroalkyl radical containing 4 to 12 carbon atoms or mixtures of said radicals;

x is 0 to 20;
y is 0 to 10;
n is 2 to 10; and
z is 0 or 1.

8. The oligomeric glycols of claim 7 wherein x is 1 to 20.

9. The oligomeric glycols of claim 8 wherein y is 0.

* * * * *

UNITED STATES PATENT AND TRADEMARK OFFICE
CERTIFICATE OF CORRECTION

PATENT NO. : 5,107,033

DATED : April 21, 1992

INVENTOR(S) : Engelbert Pechhold

It is certified that error appears in the above-identified patent and that said Letters Patent is hereby corrected as shown below:

Column 9, line 12, insert missing text. Should read --
$-CH_2-CH_2-CH_2-$;
$R^1$ is a divalent aliphatic hydrocarbon radical containing 2 to 12 carbon atoms;
$R_f$ is a straight or branched chain perfluoroalkyl radical containing 4 to 12 carbon atoms or mixtures of said radicals;
x is 0 to 20;
y is 0 to 10;
n is 2 to 10; and
z is 0 or 1. --

Column 10, line 10, insert missing text. Should read
-- R is a divalent radical of the formula: --

UNITED STATES PATENT AND TRADEMARK OFFICE
CERTIFICATE OF CORRECTION

PATENT NO. : 5,107,033

DATED : April 21, 1992

INVENTOR(S) : Engelbert Pechhold

It is certified that error appears in the above-identified patent and that said Letters Patent is hereby corrected as shown below:

Column 2, line 68 should read --x is 0 to 20, preferably 0 to 10;--.

Signed and Sealed this

Fifth Day of January, 1993

Attest:

DOUGLAS B. COMER

*Attesting Officer*  *Acting Commissioner of Patents and Trademarks*